United States Patent Office 3,148,609
Patented Sept. 15, 1964

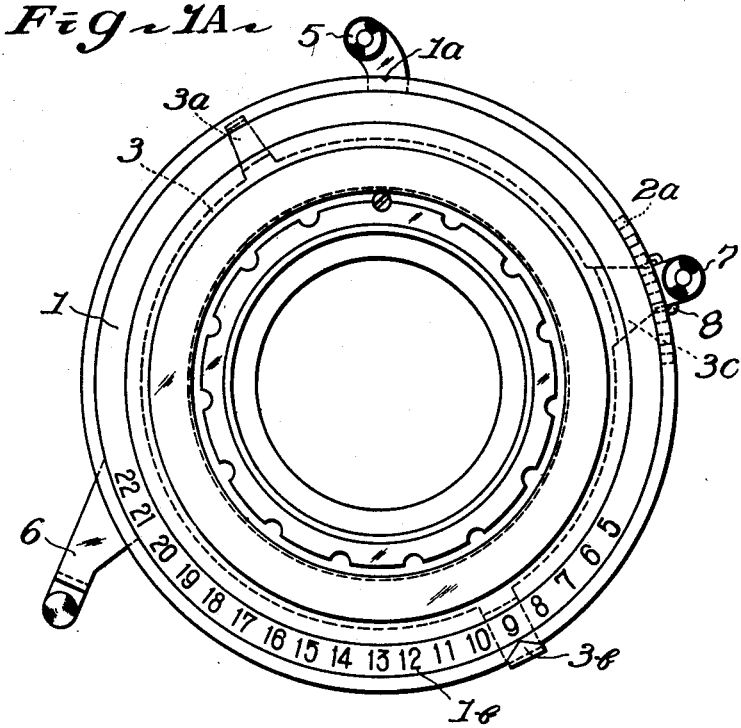
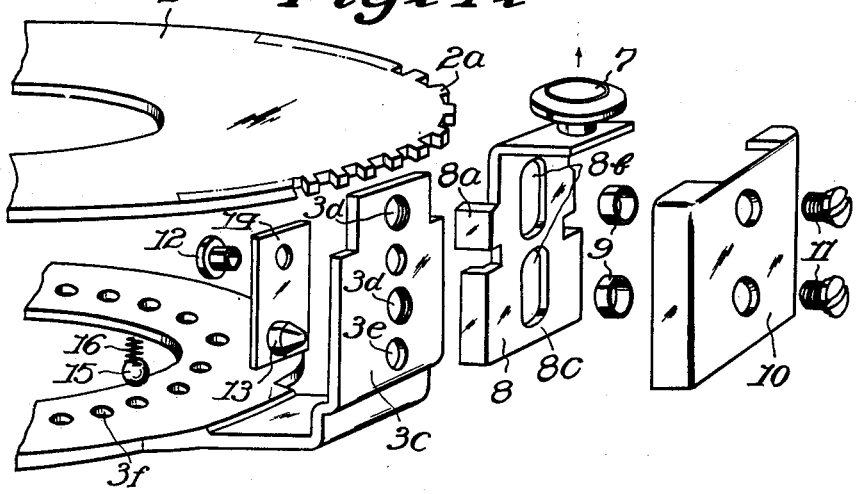

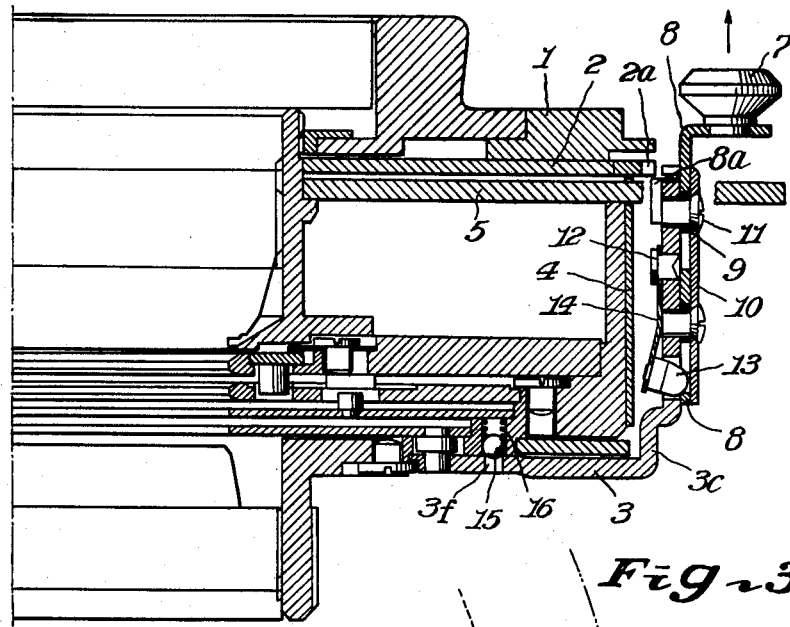
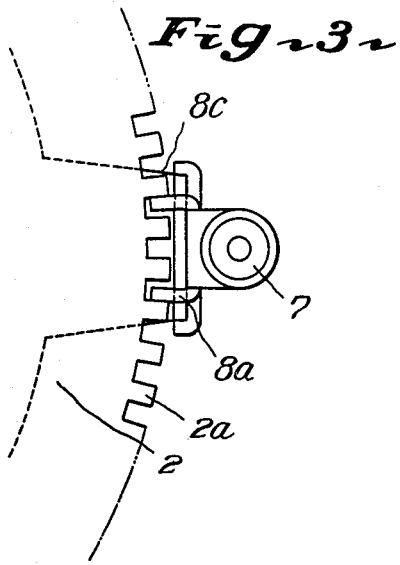
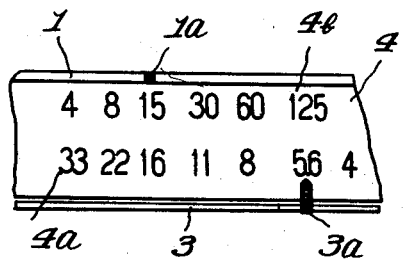

3,148,609
LENS SHUTTER CONNECTING MECHANISM BETWEEN SHUTTER SPEED AND DIAPHRAGM APERTURE CONTROLS
Naoyuki Ohara, Tokyo-to, Japan, assignor to Kabushiki Kaisha Hattori Tokeiten, Tokyo-to, Japan, a joint-stock company of Japan
Filed Aug. 28, 1961, Ser. No. 134,358
5 Claims. (Cl. 95—64)

This invention relates to lens shutters for photographic cameras, and more particularly it relates to a lens shutter having a connecting mechanism which connects a speed control member and a diaphragm aperture control member in such a manner that the combination of shutter speed and diaphragm aperture can be selected at will while the exposure value or light value is maintained at a constant value.

It is an object of this invention to provide a new and improved lens shutter for cameras which is capable of connecting and disconnecting surely the speed control member and diaphragm aperture control member.

It is another object of this invention to provide a lens shutter as stated above, wherein the speed control member and diaphragm aperture control member are surely connected at any light value by pulling up forward a knob of the connecting mechanism by a predetermined amount; when either the speed control member or the diaphragm aperture control member is made to move, the other is made to move in the state connected to the former member, thus enabling optional variation of the combination of shutter speed and diaphragm aperture without varying the light value; and the said connection is disengaged by the mere rearward pushing down of said knob of the connecting mechanism, thus enabling independent adjustment of the speed control member or diaphragm aperture control member in said disengaged state, whereby selection of light value is made possible.

It is a further object of this invention to provide a lens shutter as stated above wherein the said connecting mechanism is arranged at a most favorable position to be operated so as to be independent of a diaphragm aperture scale or an indicator of light value; and minor errors of various parts can be completely compensated for or corrected during assembling of various parts, thus enabling correct indication.

It is a still further object of this invention to provide a lens shutter wherein the connection between the speed control member and the diaphragm aperture control member is strong and sure in such a manner that when either said member reaches the end state of its operation, a further movement and disconnection of said members do not occur, thus enabling safe operation of said members without causing any unfavorable variation of the light value.

It is still another object of this invention to provide a lens shutter which possesses the various advantageous features stated above, and which, nevertheless, has a simple construction which can be easily and economically fabricated.

Said objects and other objects of this invention have been attained by adopting a connecting mechanism which comprises, in combination, an arm protruding forward from said diaphragm aperture control member, a master member mounted on said arm so as to be slidable in a direction parallel to the optical axis and having a latching pawl capable of engaging with gear teeth provided on the periphery of said speed control member, a knob protruded from said master member, a click device consisting of a spring leaf riveted on said arm and having a small pin affixed thereto, said leaf imparting an elastic force to said master member by way of said pin passing through said arm in a direction normal to the optical axis; and in which said master member, arm and spring leaf are so assembled that when said master member is pulled up by means of the said knob, said member is kept in the upper position by said small pin under the elastic force of said spring leaf, and at the same time the said latching pawl is made to engage with the gear teeth of said speed control member, thus causing connection of said speed control member and diaphragm aperture control member, and when said master member is manually depressed by way of said knob, said connection is released, thus causing independent operation of each of said speed control member and diaphragm aperture control member, and at the same time said depressed position of said master member is maintained by the elastic force of said spring leaf.

The manner in which the foregoing objects and accompanying advantages of this invention may best be achieved will be more clearly apparent by reference to the following detailed description taken in conjunction with the accompanying drawings in which the same and equivalent parts are designated by the same reference numerals and letters, and in which:

FIG. 1A is a front elevational view of one embodiment of this invention, showing particularly indicating arrangement of the connecting mechanism and, light value scale indicator therefor;

FIG. 1B is a partial side view for showing the shutter speed scale, its indicator, and diaphragm aperture scale and indicator therefor;

FIG. 2 is a side elevational view, in section taken along a vertical plane passing through the optical axis, showing the construction and arrangement of the embodiment shown in FIG. 1;

FIG. 3 is a partial plan view of the embodiment of FIGS. 1 and 2, showing particularly the state wherein a latching pawl of the connecting mechanism is meshed with the gear teeth cut on the periphery of the speed control member; and FIG. 4 is a perspective exploded view of the embodiment of FIGS. 1–3, showing particularly constructional members and arrangement of the connecting mechanism, for making said mechanism understandable.

Referring to FIGS. 1, 2 and 3, a shutter speed ring 1 is supported so as to be rotatable around the optical axis of the shutter, said ring being adapted to select the shutter speed. The shutter speed ring 1 is provided with a shutter speed indicator 1a and a light value 1b indicated thereon. A shutter speed control cam plate 2 is supported by the same shaft as the said shutter speed ring 1 so as to be operated together with said ring, said shutter speed control cam plate 2 being provided with a cam surface (not shown) for actuating a shutter speed control governor and gear teeth 2a cut on its periphery. Since the gear teeth 2a are positioned inside of the shutter speed ring 1, said teeth cannot be seen from above the shutter. A diaphragm aperture control member 3 is supported so as to be rotatable around the optical axis and is provided with an arm 3a for indicating diaphragm aperture scale 4a cut on a scale plate 4 which is mounted around the shutter periphery, an indicating arm 3b for light value scale 1b, and an arm 3c supporting the connecting mechanism. The scale plate 4 is provided with a shutter speed scale 4b which cooperates with the shutter speed indicator 1a of the speed control ring 1. In the drawing, a shutter charging lever 5 and a release lever 6, although they have no direct relation to the connecting mechanism of this invention, are shown for representing the total arrangement of the shutter. The connecting mechanism comprises a master member 8 and a knob 7 affixed on said master member, said master member being provided with a latching pawl 8a which is brought into engagement with the gear teeth 2a of the shutter speed control cam plate when said master member 8 is pulled up in the arrow direction, and two elongated guide slots 8b which are adapted to guide said master member 8 when it is moved up and down. The master member 8 is attached to the arm 3c by screwing screws 11, through spacers 9 inserted into said guide slots and holes of a cover 10, into screw holes 3d provided in the arm 3c, whereby said master member 8 is made to be movable only upward and downward. In order to maintain the master member 8 at the uppermost or lowermost position of its actuation, a spring leaf 14 attached to the arm 3c by means of a stud 12 and having a click pin 13 protruding through a window 3e of said arm 3c is used. The spring leaf 14 elastically pushes the pin 13 towards outside of the shutter, thereby pushing the inside of the master member, said pin 13 cooperating with the clicking part 8c which is formed between the lowermost edge of the lower elongated guide slot 8b and the under end of the master member 8. There is provided a steel ball 15 for clicking the diaphragm aperture control member 3, said ball being thrusted successively into holes 3f of a series by the force imparted by a spring 16, said holes being perforated at equal intervals on the same circle in said control member 3 so as to correspond to the steps of the diaphragm aperture, whereby positioning at a desired step of the diaphragm aperture is made easily possible.

The operation of the embodiment of the above-described construction according to the present invention will now be described with reference to FIGS. 1 through 4. As mentioned hereinbefore, FIG. 2 illustrates an embodiment of the shutter according to this invention in a state wherein the connecting mechanism is released, and the shutter speed control member and diaphragm aperture control member are independently able to select, respectively, a shutter speed or a diaphragm aperture. In this state, the master member 8 of the connecting mechanism is in its lowermost position of its operating range and this position is secured by the pin 13 which is pushing the upper end of the clicking part 8c, said pin 13 being elastically pushed by the elastic force of the spring leaf 14. On the other hand, since the latching pawl 8a is in a state disengaged from the gear teeth 2a, the shutter speed control cam plate 2 and the shutter speed ring 1 which moves together with said plate 2 as one body can select a desired shutter speed without being restrained by the diaphragm aperture control member 3. Furthermore, the speed control member 1 is provided with the light value scale 1b which cooperates with the arm 3b of the diaphragm aperture control member, so that it is possible to select a desired light value by using said scale. Since the diaphragm aperture control member 3 also can be moved freely, any desired diaphragm aperture can be set by means of the arm 3a and diaphragm aperture scale 4a. Of course, a desired light value can be determined by means of the arm 3b and scale 1b. In this case, the scale 1b is indicated by movement of the arm 3b, and the steel ball 15 for clicking is successively dropped into the holes 3f of the diaphragm aperture control member 3 so as to make the positioning easy. The shutter speed ring 1 also is provided with a click device similar to said device consisting of said steel ball 15 and holes 3f. These click devices participate in such a positioning action that the latching pawl 8a of the connecting mechanism can be easily engaged with the gear teeth 2a.

When in the condition wherein a desired light value has been determined, the knob 7 is pulled up in the arrow direction, the master member 8 of the connecting mechanism is pulled upward without rightward and leftward play while being guided by the slots 8b. In this operation, the click member such as the clicking part 8c ascends while pushing the click pin 13 against the elastic force of the spring leaf 14, and said pin 13 is brought into the position abutting the rear end of said clicking part 8c when said clicking part 8c reaches the uppermost position, thereby supporting the master member 8 so that it will not drop.

In this condition, since the latching pawl 8a engages with the gear teeth 2a of the shutter speed control cam plate 2, the shutter speed ring 1 and diaphragm aperture control member 3 are connected, whereby, if either member is rotated, the other member also follows said rotation, thus carrying out unified operation. In this case, the latching pawl 8a may contain an inclined part so as to facilitate said engagement.

Since, in the above-mentioned engaged condition, the connection between the shutter speed ring 1 and diaphragm aperture control member 3 is not released even when either said member reaches an end of its operational range, both said members are necessarily stopped when one of said members reaches the end of its operational range. That is, the light value is securely maintained at its adjusted position without shifting.

As described above, since according to the construction of this invention, indications of the diaphragm aperture scale, light value scale, and connecting mechanism are, respectively achieved by means of independent indicators, the various members can be respectively positioned at their most favorable positions, and, moreover, minor errors of various members can be precisely corrected. Furthermore, since the light value scale is surely engaged and corrected, it can be operated with a feeling of assurance, and since in the disengaged state of the connecting mechanism, the shutter speed ring 1 and diaphragm aperture control member 3 are entirely disengaged, they can be operated freely, thus ensuring a stable handling. The operation of the connecting mechanism is very simple because joint operation of said mechanism is ensured by the mere pulling-up of the knob 7, and release of said mechanism is achieved by merely pushing down said knob 7.

Since the said gear teeth 2a of the speed control cam plate 2 is located in the inside of and under said speed control ring 1 and the said master member 8 is covered with the cover 10 as stated above, said connecting mechanism consisting of said both members and the others is protected from mechanical damage, dust and rust.

Since it is obvious that many changes and modifications can be made in the above described details without departing from the nature and spirit of the invention, it is to be understood that the invention is not to be limited to the details described herein except as set forth in the appended claims.

What is claimed is:

1. In a photographic lens shutter of the type having an annular shutter speed control member, an annular diaphragm aperture control member, and a connecting mechanism which is provided detachably between said members, said members and mechanism being assembled so that when said mechanism is placed in the state of connecting both said members, said members are made to rotate integrally as a single body in such a manner that deviation of the diaphragm aperture caused by rotation of said diaphragm control member and deviation of exposure duration caused by rotation of said speed control member are mutually compensated for so as to maintain the exposure value (light value) constant, and when said connecting mechanism is placed in the state of disconnecting said speed control member and diaphragm aperture control member, said members can be rotated independently of each other so as to be able to select, respectively, any proper diaphragm aperture and any desired exposure duration; the improvement of said connecting mechanism which comprises, in combination, a row of teeth formed in the edge of said annular shutter speed control member, an arm protruding forward from the outer edge of said diaphragm aperture control member, a master member mounted on said arm so as to be slidable parallel to the optical axis and having a latching pawl capable of selectively engaging with said teeth on the edge of said speed control member, a knob protruding from said master member, a detent device consisting of a leaf spring riveted on said arm and a small pin affixed thereto, said spring biasing said master member by means of said pin passing through said arm in a direction normal to the optical axis; and in which said master member, arm and spring are so assembled that when said master member is pulled up by means of the said knob, said member is held in the upper position by said small pin under the elastic force of said spring, and at the same time said latching pawl engages with the teeth of said speed control member, thus causing connection of said speed control member and diaphragm aperture control member, and when said master member is manually depressed by means of said knob, said connection is released, thus causing independent operation of each of said speed control member and diaphragm aperture control member, and at the same time said depressed position of said master member is maintained by the detent device.

2. A photographic lens shutter according to claim 1, wherein the speed control member and diaphragm aperture control member are provided, respectively, with independent click devices which are adapted to facilitate easy positioning of said members and to hold the teeth of said speed control member and the latching pawl of the master member always at their correct positions when said click devices are clicked, thus enabling easy engagement and disengagement between said teeth and latching pawl.

3. A photographic lens shutter according to claim 1, wherein, for the purpose of simplifying fine adjustment, the shutter speed scale and its cooperating indicator, diaphragm aperture scale and its cooperating indicator, light value scale and its cooperating indicator, and teeth of the shutter speed control cam and its cooperating master member are independently provided.

4. A photographic lens shutter according to claim 1, wherein the teeth of the speed control member are located inside the outer periphery of the shutter speed ring, and the master member of the connecting mechanism is provided with a cover, whereby said connecting mechanism is protected from any mechanical damage and from dust and corrosion.

5. A photographic lens shutter according to claim 1, wherein the master member is provided with elongated slots and is attached movably by means of cover and screw means, and spacers are provided between said arm and said cover, preventing clamping of said master member by said screw means and thus enabling movement of the said master member to be effected.

References Cited in the file of this patent

UNITED STATES PATENTS

| | | |
|---|---|---|
| 2,596,328 | Dorsey | May 13, 1952 |
| 2,887,937 | Gebele | May 26, 1959 |

FOREIGN PATENTS

| | | |
|---|---|---|
| 312,586 | Switzerland | Mar. 29, 1956 |